July 19, 1966  L. H. DUNN  3,261,086
ALIGNING AND RETAINING PRONG AND METHOD OF
ASSEMBLING APERTURED MATING MEMBERS
Filed Sept. 14, 1964  2 Sheets-Sheet 1
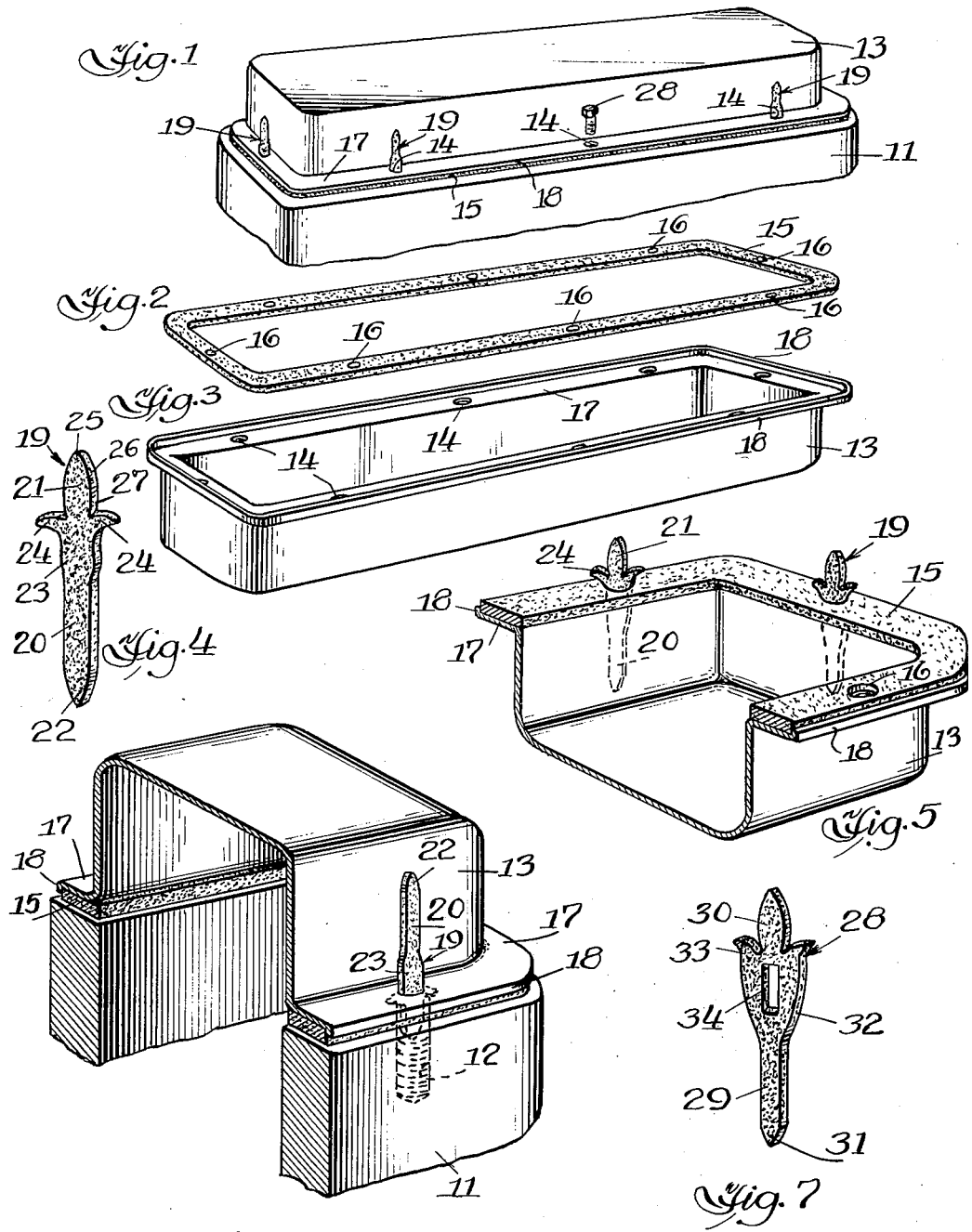
Inventor,
Lawrence H. Dunn,
By: Dressler, Goldsmith, Clement, Gordon & Ladd, Attys.

July 19, 1966   L. H. DUNN   3,261,086
ALIGNING AND RETAINING PRONG AND METHOD OF
ASSEMBLING APERTURED MATING MEMBERS
Filed Sept. 14, 1964   2 Sheets-Sheet 2
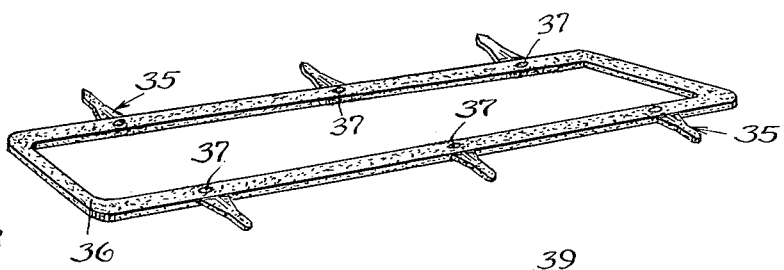
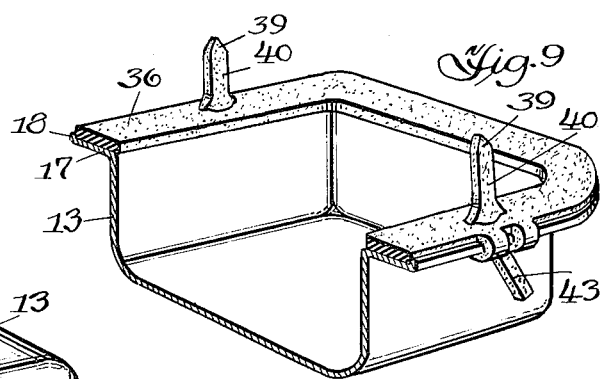
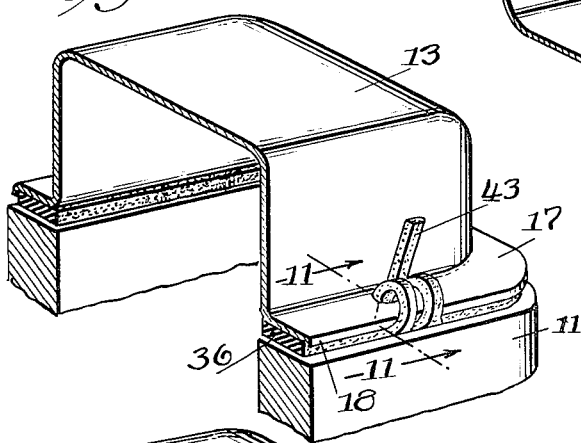
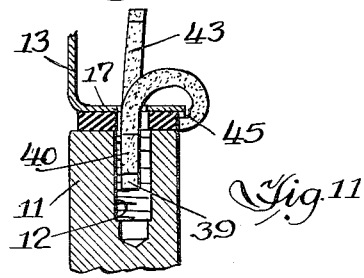
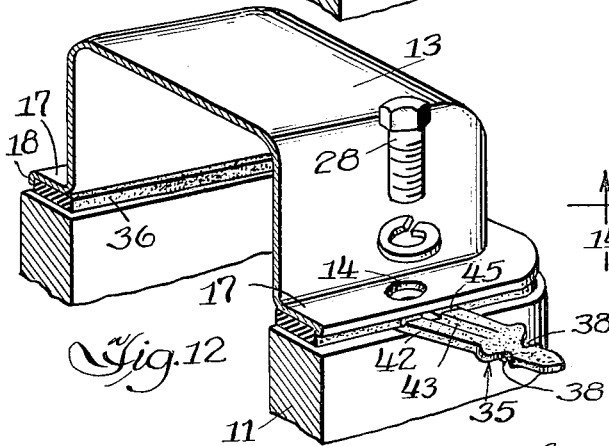
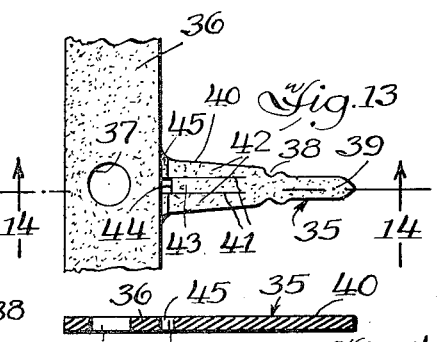
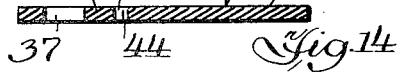
Inventor,
Lawrence H. Dunn
By: Dressler, Goldsmith, Clement, Gordon & Ladd, Attys.

United States Patent Office 3,261,086
Patented July 19, 1966

3,261,086
ALIGNING AND RETAINING PRONG AND METHOD OF ASSEMBLING APERTURED MATING MEMBERS
Lawrence H. Dunn, Skokie, Ill., assignor to Felt Products Mfg. Co., a corporation of Illinois
Filed Sept. 14, 1964, Ser. No. 396,117
11 Claims. (Cl. 29—423)

This invention relates to an aligning and retaining prong for facilitating the assembly of sealing gaskets of internal combustion engines, particularly automobile engines, with opposed apertured members such as, for example, a cylinder head and a valve cover, or a cylinder block and an oil pan.

Although the present invention will be described with particular reference to its use in assembling two mating parts of an automobile that are to be sealed together by a resilient gasket interposed between their meeting edges, it should be understood that this use is merely exemplary, as the advantages of the invention may be utilized in many different environments. For example, the prong may be used to facilitate the alignment of any two apertured members and to hold them together in alignment. The aligning and retaining prong may be used with gaskets of any composition, but is of particular advantage with gaskets of rubber composition that are very flexible. The flexibility of the gasket makes it difficult to align the gasket and to retain it in alignment with one of two mating parts until the mating parts are bolted together with the gasket interposed between their meeting edges.

It has been proposed to secure the gasket to one of the parts by adhesive. One disadvantage in the use of adhesive is that the gasket may be accidentally displaced before the adhesive has set, and it is difficult to return the gasket to its proper position. The use of some adhesives is further restricted, insofar as small repair shops are concerned, in that they require heat to make them adhere, and small repair shops usually do not have such heat treating equipment.

The aligning and retaining prong is preferably made of the same material as the gasket, but may be made of any suitable compressible, resilient material. The prong may be integral with the gasket, or may be made as a separate member. The prong is usually made for apertures of a specified size, but, if desired, may be made wider to enable it to fit a larger aperture, and may be slotted through its widest portion to enable it to be used with smaller apertures.

Each prong comprises a wedge-shaped section and a shorter section in axial alignment therewith. The term "wedge-shaped" as used herein shall be understood to include any prong section having a larger cross section adjacent one end than at the other end that is initially inserted into the apertures of the parts to be secured together by the prong. The shorter section may be of uniform width, but preferably is provided with a tapered end and has an intermediate portion of increased width to provide frictional engagement with the bore or aperture into which it is inserted in the process of aligning one mating part with another. In assembling two mating parts with a gasket interposed between their meeting edges, the gasket is positioned on one of said parts with its apertures aligned with apertures in said one part. The wedge-shaped section of a prong is inserted through a pair of aligned apertures in the gasket and in said one part, and the prong is pulled partially through the aligned apertures until it is wedged tightly in the aperture of said one part. If the aperture in the gasket is approximately the same size as the aperture with which it is aligned, the prong will be wedged tightly in both aligned apertures.

Each prong is provided with a pair of wings extending outwardly from its opposite edges at one end of the wedge-shaped section. The wedge-shaped section has its greatest width contiguous to said wings. Accordingly, as the prong is pulled into wedging position, the wings act as a visual aid to prevent the user from inadvertently pulling the prong too far. The wing spread is greater than the diameter of the aperture in the gasket and the outer edges of the wings overlie the edges of the gasket defining the aperture. If the aperture in the gasket is substantially larger than the aligned aperture in the part against which the gasket is to be held, the outer edges of the wings will serve to hold the gasket in place.

A prong is inserted through each pair of aligned apertures to hold the gasket firmly against said one part. The part to which the gasket is temporarily secured is then positioned against the second mating part to be sealed by the gasket. The short sections of the prongs are inserted into the apertures in the second mating part to guide the first part into aligned relationship with the second part.

In some installations, it is necessary to start the assembly of the two mating parts and the gasket by inserting the short sections of the prongs into one of the mating parts and then to impale the gasket and the second mating part on the wedge-shaped sections of the prongs. In such cases the short sections of the prongs are dimensioned to provide a frictional fit within the apertures in which they are inserted. The gasket and the second mating part are held against the first mating part by frictional engagement of the wedge-shaped sections of the prongs with the edges of said gasket and second mating part defining the aligned apertures.

When the mating parts that are to be sealed together by the gasket are to be bolted together, one or more of the prongs are pulled out of the aligned apertures, while the other prongs prevent any lateral shifting between the parts. Each of the prongs that has been removed from a pair of aligned apertures is replaced by a permanent fastening member, such as, for example, a bolt that is inserted through said pair of aligned apertures. Each prong that is removed is replaced by a bolt or other permanent fastening member before the mating parts can be accidentally moved out of alignment.

Structure by means of which the above mentioned and other advantages of the invention are attained will be described in the following specification, taken in conjunction with the accompanying drawings showing three preferred embodiments of the invention, in which:

FIGURE 1 is a fragmentary perspective view of a cylinder head, a valve cover, and an interposed gasket held together by a plurality of prongs, with one prong removed for replacement by a bolt;

FIG. 2 is a perspective view of an apertured gasket of the type adapted to be used with the aligning and retaining prongs;

FIG. 3 is a perspective view of a valve cover adapted to be secured to a cylinder head with the gasket of FIG. 2 interposed between the meeting edges of said parts;

FIG. 4 is a perspective view of one embodiment of the aligning and retaining prong adapted to facilitate assembly of two mating parts to be secured together with a gasket interposed therebetween;

FIG. 5 is a fragmentary enlarged view, partly in perspective and partly in section, showing an apertured gasket held in place against a valve cover by the prongs;

FIG. 6 is a fragmentary enlarged view, partly in perspective and partly in section, showing a cylinder head and a valve cover with one of the prongs holding an apertured gasket interposed therebetween;

FIG. 7 is a perspective view of another embodiment of the aligning and retaining prong;

FIG. 8 is a perspective view, showing a gasket having the prongs integral therewith;

FIG. 9 is a fragmentary enlarged view, partly in perspective and partly in section, showing the prongs of FIG. 8 retaining the gasket in position against a valve cover;

FIG. 10 is a fragmentary enlarged view, showing the valve cover and gasket of FIG. 9 held against a cylinder head by a prong;

FIG. 11 is a cross-sectional view, taken along the line 11—11 of FIG. 10;

FIG. 12 is a fragmentary enlarged view, partly in perspective and partly in section, showing the cylinder head and valve cover of FIG. 10 with a bolt in position to replace a prong that has been removed from holding position;

FIG. 13 is a fragmentary plan view of a gasket having an aligning and retaining prong integral therewith; and FIG. 14 is a cross-sectional view, taken along the line 14—14 of FIG. 13.

Referring to FIGS. 1 to 6 of the drawings, the top surface of a cylinder head 11 is provided with a plurality of apertures, preferably in the form of tapped bores 12 spaced adjacent its edges. A valve cover 13, shaped to fit on the top of the cylinder head is provided with a plurality of apertures 14 adapted to be aligned axially with apertures 12 when the valve cover is assembled with the cylinder head. A gasket 15, adapted to seal the joint between the cylinder head and valve cover when they are assembled, is also provided with apertures 16 that are aligned with apertures 12 and 14 when the cylinder head, valve cover, and gasket are assembled. Valve cover 13 is preferably provided with a rim 17 extending laterally outwardly from its lower edges, looking at the structure as it appears in FIG. 1. Rim 17 may have a depending flange 18 at its outer edges.

In the initial steps of the assembly process, a gasket 15 is seated on rim 17 with its apertures 16 in vertical alignment with apertures 14, and a prong 19 is inserted into each pair of aligned apertures. The prongs may be made of any suitable compressible, resilient material, such as, for example, rubber composition, but preferably are die cut from the scrap gasket material. The prong comprises a wedge-shaped section 20 and a shorter section 21 axially aligned with said wedge-shaped section. Section 20 has its free end tapered, as indicated at 22, to facilitate entry of said section into aperture 16. Section 20 increases in width toward section 21, as indicated at 23, and terminates in a pair of wings 24 projecting laterally outwardly adjacent one end of section 21.

The free end of section 21 is tapered, as indicated at 25, to facilitate entry of said section into bore 12. The width of section 21 increases from the tapered end for approximately half the length of the section, as indicated at 26, and then decreases in proximity to wings 24, as indicated at 27. The increasing width of portion 26 insures frictional engagement of section 21 with aperture 12. The portion 27 is cut inwardly to decrease the width of the section adjacent wings 24 to provide clearance for the wings when they are folded against the sides of section 21, as hereinafter described.

When a gasket is to be secured to a valve cover, the wedge-shaped section 20 of the prong is inserted through apertures 16 and 14, and the free end 22 is then pulled outwardly until the portion 23 of increased width crowds the prong in the apertures to provide a firm frictional engagement with the aperture in said valve cover. Wings 24 serve as a visual aid to prevent anyone from inadvertently pulling the prong entirely through any pair of aligned apertures. With the prongs in the position indicated in FIG. 5, the wings 24 overlie the edges of the gasket defining the aperture in the gasket, and the gasket is firmly held against accidental displacement relative to the valve cover. Valve cover 13, with gasket 15 secured thereto, is then inverted, and sections 21 of the prongs are then inserted into apertures 12 to insure proper alignment of the cover and gasket with the cylinder head.

After the cover and gasket have been placed on the cylinder head, the free end 22 of the prong projects upwardly, as shown in FIG. 6. As the prong is pulled upwardly to remove it, wings 24 are forced inwardly against the sides of section 21 so that they can pass through apertures 16 and 14. The width of the sides of section 21 adjacent wings 24 is reduced sufficiently to provide clearance for the wings, so that the total width of the prong and wings will not be great enough to prevent removal of the prongs in the manner intended. Each prong 19 that is removed from the aligned apertures is replaced by a permanent fastening member, such as, for example, a bolt 28. Each bolt or other permanent fastening member is inserted through apertures 14 and 16, and is then threaded into aperture 12, which is preferably provided with threads for bolt 28, or is secured in place in any other suitable manner. Bolts 28 comprise the permanent securing means for holding the valve cover in place, and are screwed tight enough to compress gasket 15 to provide an effective seal for the joint between the valve cover and the cylinder head.

The configuration of prongs 19 prevents any of them from being inserted into apertures 16 and 14 in the wrong direction. It is preferred to insert a prong 19 into each pair of aligned apertures 16 and 14 in order to secure the gasket to the valve cover. However, it does not require a prong in every pair of apertures to align the valve cover on the cylinder head. Where the cylinder head and valve cover are large enough to require numerous prongs for securing the gasket to the cover, it may be desirable to reduce the amount of work required for aligning the valve cover with the cylinder head. This can be done, without affecting the security with which the gasket is held against the valve cover, by removing section 21 from some of the prongs. The section 21 does not perform any function with reference to the securement of gasket 15 to valve cover 13.

Although prong 19 is made of compressible material, it is intended only for apertures of a certain size, and a different prong is required for apertures of different sizes. In FIG. 7, I have illustrated a prong 28 that may be used with apertures of different diameters without any adjustment. Prong 28 has a wedge-shaped section 29 and a shorter section 30 in axial alignment therewith. The free end of section 29 is tapered, as indicated at 31, to faciltate entry of said section into apertures in a gasket and in a member, such as a valve cover, to which the gasket is to be temporarily secured for assembly with a cylinder head or similar member. Section 29 increases in width towards section 30, as indicated at 32, and terminates in a pair of wings 33 projecting laterally outwardly adjacent one end of section 30.

The portion of enlarged width of prong 28, indicated at 32, is provided with a slot 34 that permits the wide portion of the prong to be collapsed to a much smaller size than would be possible without the slot. The prong is sufficiently stiff in the lateral direction so that when it is used in any aperture within the range of sizes for which it is adapted to be used, it is collapsed only to the extent necessary for it to fit within the aperture, and the enlarged width at 32 enables the prong to have a frictional engagement with apertures of different sizes within a wide range. Section 30 is preferably a duplicate of section 21 of prong 19 and functions in the same manner. However, if desired, section 30 may be increased in width and provided with a slot similar to slot 34 if the valve covers are to be aligned with cylinder heads having bores of different sizes.

In the embodiment of FIGS. 8 to 14, a plurality of prongs 35 project laterally outwardly from the outer edge of the body portion of a gasket 36 with which they are integral. The prongs 35 are spaced to conform to the spacing of the apertures in the valve cover or other member to which the gasket is to be secured. The gasket is provided with apertures 37 adapted to register with apertures 12 in the cylinder head and apertures 14 in the valve cover.

Each prong 35 has its free end tapered, as indicated at 39, to facilitate entry of said prongs through apertures 14 and 37. Prong 35 has a wedge-shaped section 40 that increases in width toward the outer edge of gasket 36. A pair of parallel slits 41, cut entirely through the thickness of prongs 35 and extending longitudinally thereof, divide wedge-shaped section 40 longitudinally into two integral strips 42 and a tongue 43. A transverse slit 44 extending between slits 41 and cut entirely through the thickness of prong 35 separates tongue 43 along one end adjacent the outer edge portion of gasket 36. Strips 42 are notched or grooved along a line parallel to slit 44, as indicated at 45, to provide clearance for flange 18, and also to increase the flexibility of the prong along a line close to the outer edge of the gasket.

Prong 35 is preferably provided with a notch 38 in each longitudinal edge. When the prong is pulled through the aligned apertures 14 and 37, as indicated in FIG. 9, notches 38 engage the edges of the gaskets defining apertures 37 to help hold the gasket in place against the mating part against which it is to be held.

In use, gasket 36 is positioned on rim 17 with apertures 37 aligned with apertures 14. Prongs 35 extend outwardly with notches 45 fitting over flange 18. It should be noted that prongs 35 are long enough to extend around rim 17 and into the adjacent aligned apertures. As shown in FIG. 9, prongs 35 are bent in a clockwise direction and tapered end 39 is inserted through apertures 14 and 37 so as to project upwardly through gasket 36. End 39 is pulled upwardly until wedge-shaped section 40 engages apertures 14 and 37 in tight frictional engagement to prevent accidental displacement of the prong. As the prong is bent to cause the end 39 to enter apertures 14 and 37, tongue 43 springs out of the plane of section 40 and projects in the direction opposite that of end 39. The frictional engagement of section 40 with apertures 14 and 37 holds gasket 36 firmly against rim 17.

Valve cover 13 is then inverted, and ends 39 of each prong are inserted into apertures 12 of the cylinder head to align the valve cover with the cylinder head, as shown in FIG. 10. After the valve cover is properly positioned relative to the cylinder head, prongs 35 are replaced by bolts 28 to provide permanent securement. The prongs are removed from apertures 12, 37 and 14 by pulling tongues 43 outwardly. After each prong is removed from apertures 12, 37 and 14, it may be torn from the gasket, if desired. Notches 45 are deep enough to permit the prongs to be separated from the gasket without difficulty.

Although I have described several embodiments of the invention in considerable detail, it will be understood that the description thereof is intended to be illustrative, rather than restrictive, as many details of structure may be modified or changed without departing from the spirit or scope of the invention. Accordingly, I do not desire to be restricted to the exact structure described.

I claim:

1. An aligning and retaining prong comprising a compressible, resilient elongated wedge-shaped section having one end dimensioned to extend through aligned apertures in a gasket and in one of two mating parts that are to be held together with said gasket interposed between their meeting edges, and a portion having a transverse width greater than the diameter of said aligning apertures, said wider portion being engageable with said aligned apertures to hold said gasket against accidental displacement relative to said one mating part.

2. An aligning and retaining prong comprising a compressible, resilient, elongated flat wedge-shaped section having one end dimensioned to extend through aligned apertures in a gasket and in one of two mating parts that are to be held together with said gasket interposed between their meeting edges, a wider portion engageable with said aligned apertures to hold said gasket against accidental displacement relative to said one mating part, and wings extending outwardly from said wider portion, said wings acting as a visual aid to properly locate said prong.

3. A compressible resilient aligning and retaining prong comprising a wedge-shaped section and a longitudinally aligned section extending from one end of said wedge-shaped section, the free end of said wedge-shaped section being dimensioned to extend through aligned apertures in a gasket and in one of two mating parts that are to be held together with said gasket interposed between their meeting edges, the wider portion of said wedge-shaped section being engageable with said aligned apertures to hold said gasket against accidental displacement relative to said one mating part, and pointed wings extending outwardly from said wider portion, said wings acting as a visual aid to properly locate said prong, and said second mentioned section being dimensioned to extend into apertures in said other mating part to align said gasket and said first mating part with said second mating part.

4. A compressible, resilient aligning and retaining prong comprising an elongated wedge-shaped section and a longitudinally aligned section extending from one end of said wedge-shaped section, the free end of said wedge-shaped section being dimensioned to extend through aligned apertures in a gasket and in one of two mating parts that are to be held together with said gasket interposed between their meeting edges, the wider portion of said wedge-shaped section being engageable with said aligned apertures to hold said gasket against accidental displacement relative to said one mating part, and pointed wings extending outwardly from said wider portion, said wings acting as a visual aid to properly locate said prong, and said second mentioned section being dimensioned to extend into apertures in said other mating part to align said gasket and said first mating part with said second mating part, said second mentioned section having its intermediate portion wider than its free end to provide a frictional fit between said intermediate portion and apertures in which said free end fits loosely.

5. An aligning and retaining prong comprising a compressible, resilient elongated wedge-shaped section having one end dimensioned to extend through aligned apertures in a gasket and in one of two mating parts that are to be held together with said gasket interposed between their meeting edges, and a wider portion engageable with said aligned apertures to hold said gasket against accidental displacement relative to said one mating part, and wings extending outwardly from said wider portion, said wings acting as a visual aid to properly locate said prong, said wider portion having an opening extending through the thickness of said prong to increase the extent to which said wider portion may be compressed whereby it is adapted for frictional engagement in apertures of different sizes.

6. A compressible, resilient aligning and retaining prong comprising a wedge-shaped section and a longitudinally aligned section extending from one end of said wedge-shaped section, the free end of said wedge-shaped section being dimensioned to extend through aligned apertures in a gasket and in one of two mating parts that are to be held together with said gasket interposed between their meeting edges, the wider portion of said wedge-shaped section being engageable with said aligned apertures to hold said gasket against accidental displacement relative to said one mating part, the wider portion of said wedge-shaped section terminating in a pair of laterally extending wings adapted to serve as an aid in the proper use of said prong, and said second mentioned section being dimensioned to extend into apertures in said other mating part to align said gasket and said first mating part with said second mating part, said second mentioned section being of reduced width adjacent said wings to provide clearance for said wings, whereby said prong may be removed from said aligned apertures by pulling it as said wings are folded inwardly against adjacent edges of said second mentioned section.

7. A compressible, resilient gasket adapted to seal two mating parts having meeting edges provided with apertures positioned so as to be aligned when said mating parts are assembled, said gasket comprising a body portion provided with apertures spaced to conform to the spacing of the apertures in said mating parts and integral wedge-shaped prongs extending outwardly from the outer edges of said body portion in alignment with the apertures of said body portion, each of said prongs having sufficient length to extend around the outer edge of one of said mating parts for insertion into aligned apertures when said mating parts and gasket are positioned for assembly.

8. A compressible, resilient gasket adapted to seal two mating parts having meeting edges provided with apertures positioned so as to be aligned when said mating parts are assembled, said gasket comprising a body portion provided with apertures spaced to conform to the spacing of the apertures in said mating parts and integral wedge-shaped prongs extending outwardly from the outer edges of said body portion in alignment with the apertures of said body portion, each of said prongs having sufficient length to extend around the outer edge of one of said mating parts for insertion into aligned apertures when said mating parts and gasket are positioned for assembly, and means projecting from each prong inserted into the aligned apertures of said mating parts to serve as a pull tab to remove said prongs from said aligned apertures.

9. A compressible, resilient gasket adapted to seal two mating parts having meeting edges provided with apertures positioned so as to be aligned when said mating parts are assembled, said gasket comprising a body portion provided with apertures spaced to conform to the spacing of the apertures in said mating parts and integral wedge-shaped prongs extending outwardly from the outer edges of said body portion in alignment with the apertures of said body portion, each of said prongs having sufficient length to extend around the outer edge of one of said mating parts for insertion into aligned apertures when said mating parts and gasket are positioned for assembly, each of said prongs having an integral tongue defined by two longitudinal slits and a transverse slit extending between said longitudinal slits adjacent the outer edge of said body portion, said tongues being adapted to facilitate removal of prongs inserted into the aligned apertures of said mating parts.

10. A compressible, resilient gasket adapted to seal two mating parts having meeting edges provided with apertures positioned so as to be aligned when said mating parts are assembled, said gasket comprising a body portion provided with apertures spaced to conform to the spacing of the apertures in said mating parts and integral wedge-shaped prongs extending outwardly from the outer edges of said body portion in alignment with the apertures of said body portion, each of said prongs having sufficient length to extend around the outer edge of one of said mating parts for insertion into aligned apertures when said mating parts and gasket are positioned for assembly, each of said prongs having a transverse weakened portion adjacent the outer edge of said body portion to facilitate the separation of said prongs from said body portion when said mating parts are in sealed engagement.

11. A method of assembling an apertured gasket with mating parts having apertures in their meeting edges spaced to conform to the spacing of the apertures of said gasket, said method comprising the steps of positioning the gasket on one of said mating parts with the apertures of said gasket and said one mating part in axial alignment, inserting wedge-shaped compressible, resilient prongs into a plurality of pairs of said axially aligned apertures, pulling said prongs partially through said apertures into a tight frictional engagement therewith, positioning said first mating part, with said gasket held thereagainst, into mating relationship with said second mating part with projecting sections of said prongs extending into apertures in said second mating part, pulling one prong out of its aligned apertures, inserting a permanent fastening member into the aligned apertures from which said one prong has been removed while said gasket and mating parts are held in position by other prongs, securing said permanent fastening member in place, and thereafter replacing each prong by a permanent fastening member as a separate operation.

References Cited by the Examiner
UNITED STATES PATENTS

| | | | |
|---|---|---|---|
| 1,109,094 | 9/1914 | Weckbaugh | 29—468 |
| 1,560,617 | 11/1925 | Stanick | 29—468 |
| 2,324,568 | 7/1943 | Duggan | 277—10 X |
| 2,709,290 | 5/1955 | Rosenthal | 24—204 |
| 2,802,297 | 8/1957 | Meyer | 5—356 |
| 2,945,715 | 7/1960 | Burrell | 277—10 |

JOHN F. CAMPBELL, *Primary Examiner.*

THOMAS H. EAGER, *Examiner.*